Aug. 27, 1929.  J. R. PEDEN  1,725,966
CAMERA
Filed May 7, 1927   2 Sheets-Sheet 1
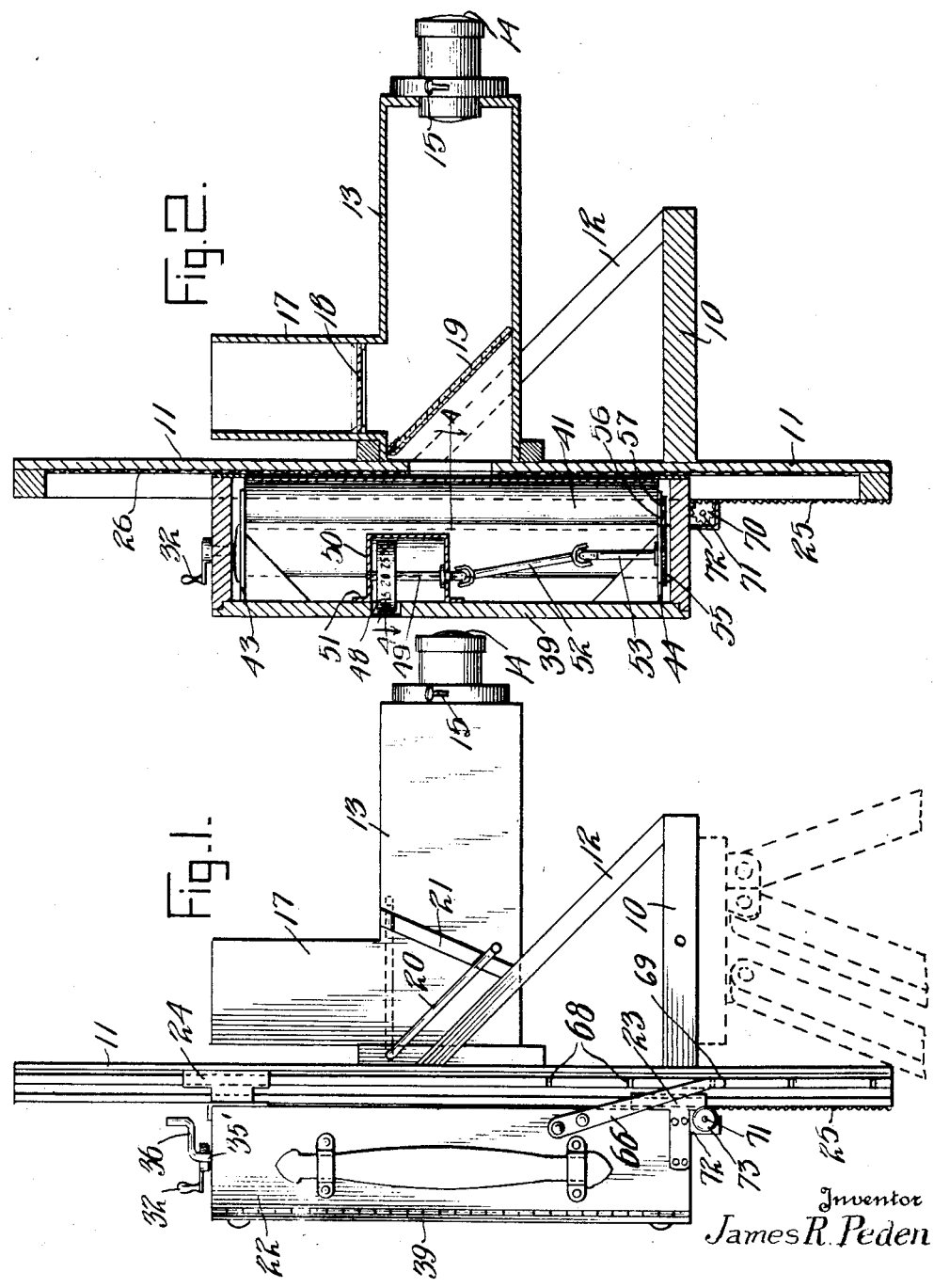
Inventor
James R. Peden Aug. 27, 1929.  J. R. PEDEN  1,725,966
CAMERA
Filed May 7, 1927  2 Sheets-Sheet 2
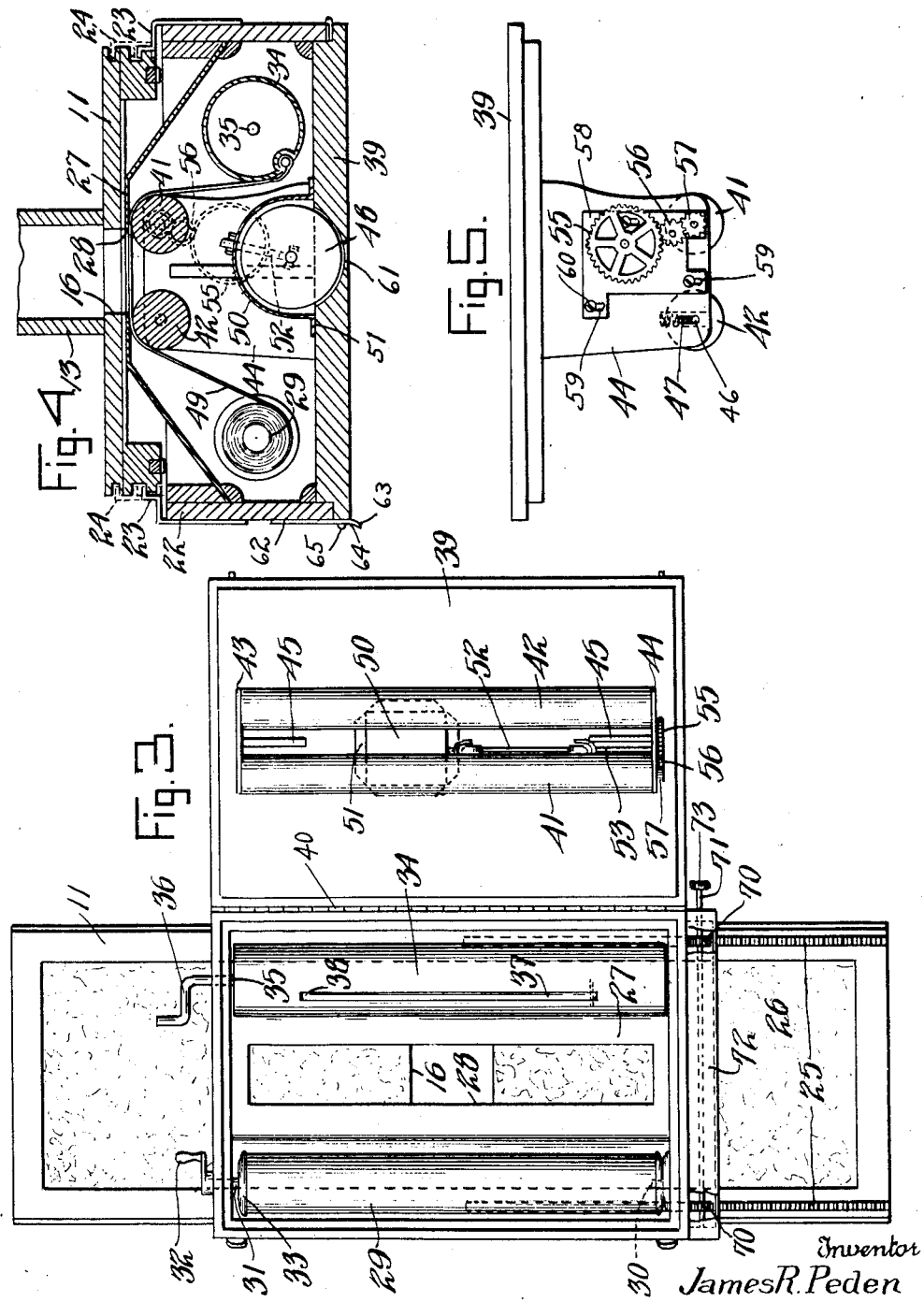
Inventor
James R. Peden
By
Attorney Patented Aug. 27, 1929.

1,725,966

UNITED STATES PATENT OFFICE.

JAMES ROBERT PEDEN, OF GREENVILLE, SOUTH CAROLINA.

CAMERA.

Application filed May 7, 1927. Serial No. 189,710.

My invention relates to multiplying magazine film cameras and it is an object of the invention to provide a simple and inexpensive device of this character which may be used for taking a plurality of pictures upon a single film roll all as will be hereinafter more particularly described and claimed.

Referring to the accompanying drawings, which are made a part hereof and on which similar reference characters indicate similar parts, Figure 1 is a side elevation illustrating one embodiment of my invention, Figure 2, a central vertical section, Figure 3, a rear elevation showing the door of the film magazine in open position, Figure 4, a section on the line 4—4 of Figure 2, and Figure 5, a bottom plan view of the door of Figure 3.

In the drawings reference character 10 indicates a base or supporting member provided with the usual means for connection with a tripod by means of which the camera may be supported either in an upright or a horizontal position. To the base or supporting member 10 is fixed an elongated or rectangular body 11, and a pair of braces 12 are arranged in inclined position and connect the outer edge of the base with the body 11 and hold them substantially at right angles to each other. On the front side of the body 11 is provided a box-like casing 13 for supporting a lens 14 and a shutter 15 at its outer end, such casing being mounted in front of an opening or window 16 in the body 11. The rear upper portion of the casing 13 is provided with an opening about which is disposed an upstanding focusing jacket 17 having an open upper end and a ground glass 18 mounted adjacent its lower end. A mirror 19 is pivoted at its rear end in the upper rear portion of the casing 13 on an operating lever 20, such mirror serving while in a position shown in Fig. 2 to reflect the image upwardly through the focusing jacket but arranged to be swung upwardly to a horizontal position after the camera has been properly focussed to permit the picture to be taken. In order to maintain the mirror in proper position a bracket 21 is secured in an inclined position on the side of the casing 13, such bracket being provided with elevated portions adjacent each end arranged to engage the handle and hold it in a definite position.

A film magazine or compartment 22 is slidably mounted on the rear side of the body 11, such magazine being secured to said body by means of upper and lower brackets 23 and 24 which engage tongues on the edge of the body 11. The film magazine 22 is provided with a door 39 which is connected to the side of the same by means of a piano hinge 40. As will be observed from Figs. 2 and 3, the stationary body of the camera is formed of a rectangular plate provided with an upstanding marginal rim formed of strips of thick material and in the side members of such rim are mounted racks 25 for a purpose to be hereinafter explained. The surface of the plate within the confines of the rim is provided with a felt covering 26 for protecting the respective contacting surfaces. The bottom portion of the film magazine 22 which is disposed next to the body 11 is inclined at each side, such inclined portion extending inwardly and engaging the felt covering 26 of the body member. The inclined sides are connected by means of a thin wall 27 which lies flat against the felt covering 26 and such thin wall is provided with a longitudinally disposed slot 28 which extends substantially from end to end of the same, as shown in Figure 3.

A film roll 29 is adapted to be pivotally supported in one side of the film compartment by means of a lower spindle bearing 30 and an upper spindle bearing 31. Said upper spindle bearing being provided with a flattened lower extremity and with a handle 32 at its upper end by means of which the spool 33 carrying the film may be rotated. A receiving spool 34 is adapted to be pivotally mounted in the opposite side of the film compartment upon a bearing shaft 35 having its upper end bent to form a handle 36 by means of which the same may be rotated. The receiving spool 34 is provided with a film engaging and holding lever 37 having one end pivotally mounted in a slot in the receiving spool and having its other end bent at right-angles and arranged to enter an opening in the spool for holding the film in position, such bent end being provided with a heel 38 by means of which it may be removed from engagement with the spool to release the film.

In the operation of making pictures the film 29 is attached by means of the lever 37 to the receiving spool 34 and the handle 36 is rotated until the film is brought to a position in front of the slot 28 and window 16 whereupon the sliding film compartment is disposed at its extreme elevated position or if desired at its extreme lower position and moved toward the opposite position as each exposure is made. After the entire width of the film has been exposed the handle 36 is rotated to advance the exposed portion of the film and bring into position the unexposed portion of the film whereupon the operation is repeated. This operation is continued until all of the film has been exposed after which the handle 32 may be rotated to wind the film back upon its original spool 33. This permits the camera to be loaded by daylight without requiring a dark room in which to load or unload the same.

In order to hold the film close to the slot 28 in the forward portion of the film compartment and the opening 16 I provide a pair of spaced rollers 41 and 42 pivotally supported in brackets 43 and 44 mounted at the upper and lower ends of the central portion of the door 39. In order to reenforce the brackets 43 and 44 additional brackets 45 may be provided. The rollers 41 and 42 are preferably yieldingly supported and to this end I provide slots 46 which are disposed substantially at right angles to the door and longitudinally of the brackets and the inner end of said slots are provided with sockets in each of which is disposed a spring 47 which bears against the pivot of the roller and yieldingly presses the roller outwardly at its greatest distance from the door in a position to yieldingly engage the film as it passes the window 16. By these rollers the film is maintained substantially flat over the window 16 which permits a picture to be made which is not distorted and as the film passes over the rollers it causes them to rotate.

In order to determine the number of exposures that have been made I provide a disk register 48 mounted upon a shaft 49 enclosed in a substantially semi-cylindrical casing 50 attached by means of marginal flanges 51 upon the inside of the door 39 behind the rollers 41 and 42. The shaft 49 is connected, by means of a universal joint, to a second shaft 52 and to the lower end of which is connected a third shaft 53. The lower end of the shaft 53 extends through a slot not shown in the lower bracket 44 and has fixed on its end a gear 55 which engages an intermediate gear 56 which in turn engages another gear 57 on the end of the roller 41. The gears 55, 56 and 57 are maintained in fixed relation by means of a frame 58 (see Fig. 5) said frame being provided with a plurality of slots 59 through which fastening elements 60 extend for slidably holding the frame 58 on the bracket to permit a slight yielding action when the roller 41 is in engagement with the film.

A window 61 in substantially the central portion of the door 39 permits the disk register 48 to be viewed and as the film is unwound from the film roll on to the receiving spool the roller 41 is rotated and through the gears 55, 56 and 57 and the shafts 53, 52 and 49 the disk register 48 is also rotated so that the number of exposures made is displayed through the window 61 in the back of the camera.

In order to hold the door 39 closed I provide a corner bracket 62 having an integrally formed resilient extension or spring finger 63 which extends beyond the edge of the door to form a flexible latch. A perforation 64 is provided in such flexible extension in the part that overlies the edge of the door and a cooperating pin 65 is placed in the edge of the door for engagement in such perforation. Also the tip of the resilient finger or latch is preferably inclined to cause the same to ride over the pin and permit the pin to engage the perforation to hold the door in closed position.

It will be understood from the foregoing that on account of the film magazine or compartment 22 being slidably connected to the body 11 it is possible to take a number of pictures extending entirely across the width of the film from the top to the bottom of the film compartment. In order to determine the proper position of the film compartment relative to the body 11 I provide a spring finger 66 having an inturned end 67 for engagement in notches 68 in the side of the body 11, such notches being disposed in proper spaced relation at equal intervals corresponding to the length of the film to be exposed through the window 16. The lower portion of the spring finger 66 is provided with a curved manipulating or finger engaging portion 69 by means of which it may be withdrawn from engagement with one of the notches 68.

In order to move the film magazine longitudinally of the body 11 I provide a pair of pinions 70 for engagement with the racks 25, such pinions being fixed upon a shaft 71 journaled in a casing 72 and a knurled head 73 is provided by means of which the shaft and pinions may be rotated to cause them to travel along the racks 25 for moving the box 22. The knurled head 73 may be operated with the thumb and third finger while the spring finger is held out of engagement with the body 11 by the forefinger.

Any desired means may be used for determining when the film reaches a point at which the first exposure may be made and I therefore do not illustrate such means. With a camera such as I have constructed a spool containing a film of any desired length and from two to ten inches in width may be used and from which one to five longitudinal rows of exposures may be made through the entire length of the film. Also if desired pictures of different sizes may be made by varying the size of the window 16 and by accordingly varying the number of notches in the side of the body 11. Also by the use of kits or masks of any desired character, with or without fancy borders, oval or pictures of other shapes may be made.

It will be obvious to those skilled in the art that various changes may be made in my device without departing from the spirit of the invention and therefore I do not limit myself to what is shown in the drawings and described in the specification, but only as indicated in the appended claims.

Having thus fully described by said invention, what I claim as new and desire to secure by Letters Patent, is:

1. A camera comprising an elongated body, a film magazine movable longitudinally of said body, means for moving the film longitudinally within the film magazine, a roller arranged to bear against the film and be rotated by the same as it is moved within the film magazine, and means associated with said roller for indicating the number of exposures of the film, substantially as set forth.

2. A camera comprising a body having a plurality of notches therein, a film magazine movable longitudinally of the body to permit the film to be exposed across its entire width, a spring finger carried by the film magazine and arranged to selectively engage said notches for holding the film magazine in a fixed position, a rack extending longitudinally of the body, a pinion carried by said magazine, means for rotating said pinion to cause the film magazine to move longitudinally of said body, and means for passing the film transversely within the film magazine whereby said film may be exposed a plurality of times in both longitudinal and transverse directions, substantially as set forth.

3. A camera comprising a body having an opening through which a film is adapted to be exposed, a film magazine slidably mounted in said body and adapted to contain a film of greater width than said opening permitting a number of exposures to be made across the width of the film, indicating means for determining the relative position of the film over said opening, film supporting means arranged to engage the back of the film and indicating means actuated by said last mentioned means for determining the number of exposures of the film, substantially as set forth.

4. The combination of a camera, of a body adapted to be supported in fixed position, said body having a window through which a film is adapted to be exposed, an elevated marginal rim on the rear side of the body, a film magazine having a slot in its wall adjacent said body for permitting the interior of the film magazine to be exposed therethrough at all positions of the film compartment, means carried by said film magazine and slidably engaging the sides of the body, means for sliding the film magazine longitudinally of the body, means for supporting a film roll in one side of the film magazine, a film receiving spool in the opposite side of said magazine, means for fastening a film to said film spool, and means for holding the film in position closely adjacent the slot in the film magazine whereby various portions of the film may be exposed as the film magazine is moved longitudinally of its supporting body, substantially as set forth.

5. The combination of a camera, of a body adapted to be supported in fixed position, said body having a window through which a film is adapted to be exposed, an elevated marginal rim on the rear side of the body, a film magazine having a slot in its wall adjacent said body for permitting the interior of the film magazine to be exposed therethrough at all positions of the film compartment, means carried by said film magazine and slidably engaging the sides of the body, means for sliding the film magazine longitudinally of the body, means for supporting a film roll in one side of the film magazine, a film receiving spool in the opposite side of said magazine, means for fastening a film to said film spool, means for holding the film in position closely adjacent the slot in the film magazine whereby various portions of the film may be exposed as the film magazine is moved longitudinally of its supporting body, and means actuated by said last mentioned means for determinng the number of exposures of the film, substantially as set forth.

6. The combination in a camera of a body adapted to be supported in fixed position, said body having a window through which a film is adapted to be exposed, an elevated marginal rim on the rear side of the body, a film magazine having a slot in its wall adjacent said body for permitting the interior of the film magazine to be exposed therethrough at all positions of the film compartment, means carried by said film magazine and slidably engaging the sides of the body, means for sliding the film magazine longitudinally of the body, means for supporting a film roll in one side of the film magazine, a film receiving spool in the opposite side of said magazine, means for fastening a film to said film spool, means for holding the film in position closely adjacent the slot in the film magazine whereby various portions of the film may be exposed as the film magazine is moved longitudinally of its supporting body, said last mentioned means comprising one or more rollers arranged to be rotated by the longitudinal movement of the film and an indicator actuated by said roller, substantially as set forth.

7. The combination in a camera of a body adapted to be supported in fixed position, said body having a window through which a film is adapted to be exposed, an elevated marginal rim on the rear side of the body, a film magazine having a slot in its wall adjacent said body for permitting the interior of the film magazine to be exposed therethrough at all positions of the film compartment, means carried by said film magazine and slidably engaging the sides of the body, means for sliding the film magazine longitudinally of the body, means for supporting a film roll in one side of the film magazine, a film receiving spool in the opposite side of said magazine, means for fastening a film to said film spool, means for holding the film in position closely adjacent the slot in the film magazine whereby various portions of the film may be exposed as the film magazine is moved longitudinally of its supporting body, said last mentioned means comprising one or more yieldably mounted rollers and indicating means actuated by said roller to indicate the number of exposures, substantially as set forth.

8. A camera comprising a body, a film magazine associated with said body, a pair of spaced brackets having correspondingly arranged slots therein, a roller mounted between said brackets and pivotally supported within said slots, spring means for pressing the roller toward one end of the slots, and means associated with said roller for indicating the number of revolutions of the same, substantially as set forth.

9. A camera comprising a body, a film magazine slidably mounted on the body and arranged to support a film in a position to permit exposures to be made across its width, a pair of brackets, a roller yieldably supported by said brackets and arranged to support the film and be rotated thereby, indicating means associated with said roller, a plurality of gears between said roller and indicating means, and a slidably mounted frame supporting said gears on one of said brackets, substantially as set forth.

10. A camera comprising a body, a film magazine slidably mounted on the body and arranged to support a film in a position to permit exposures to be made across its width, a pair of brackets, a roller yieldably supported by said brackets and arranged to support the film and be rotated thereby, indicating means associated with said roller, a plurality of gears between said roller and indicating means, a slidably mounted frame supporting said gears on one of said brackets, and means for moving said film magazine and for stopping the same at intervals, substantially as set forth.

11. A camera comprising an elongated body having a window through which a film is adapted to be exposed, a film magazine slidably mounted on said body, means in said film magazine for moving the film across the window, a roller adapted to be engaged by the moving film, and an indicator connected to said roller and adapted to be actuated thereby for indicating the number of exposures of the film, substantially as set forth.

12. A camera comprising a body having a window through which a film is adapted to be exposed, a film carrying magazine mounted on said body and movable to expose portions of the film across its width, means for moving the film longitudinally in the film magazine, and means actuated by the moving film for indicating the number of exposures, substantially as set forth.

In witness whereof, I have hereunto set my hand at Greenville, South Carolina, this 26th day of February, A. D. nineteen hundred and twenty-seven.

JAMES ROBERT PEDEN.